US008521699B2

(12) United States Patent
Kureshy et al.

(10) Patent No.: US 8,521,699 B2
(45) Date of Patent: Aug. 27, 2013

(54) TRACKING CHANGES ACROSS COLLECTION OF DATA TABLES

(75) Inventors: Arif Kureshy, Sammammish, WA (US); Nicolae Surpatanu, Woodinville, WA (US); Alexander Samoylenko, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 192 days.

(21) Appl. No.: 13/231,178

(22) Filed: Sep. 13, 2011

(65) Prior Publication Data

US 2013/0066888 A1 Mar. 14, 2013

(51) Int. Cl.
*G06F 7/00* (2006.01)
*G06F 17/00* (2006.01)
*G06F 9/44* (2006.01)

(52) U.S. Cl.
USPC .......................................... 707/687; 717/121

(58) Field of Classification Search
USPC ................. 707/603, 625, 687, 690, 695, 752; 717/120, 121, 122
See application file for complete search history.

(56) References Cited

U.S. PATENT DOCUMENTS

| | | | |
|---|---|---|---|
| 5,829,001 | A | 10/1998 | Li et al. |
| 7,013,312 | B2 | 3/2006 | Bala et al. |
| 7,769,757 | B2 | 8/2010 | Grefenstette et al. |
| 2004/0199552 | A1* | 10/2004 | Ward et al. ................... 707/204 |
| 2006/0277223 | A1* | 12/2006 | Gupta et al. ................... 707/201 |
| 2007/0266371 | A1* | 11/2007 | Ramakrishnan ............... 717/121 |

OTHER PUBLICATIONS

Author: Garland et al.; title: Improved Change Tracking for Software Maintenance; Date: 1991; Publisher: IEEE, pp. 32-41.*
Randal, Paul S., "Tracking Changes in Your Enterprise Database", Retrieved at <<http://technet.microsoft.com/en-us/magazine/2008.11.sql.aspx?pr=blog>>, Retrieved Date: Jul. 7, 2011, Pages 7.
"What's New in SQL Server Compact 4.0", Retrieved at <<http://technet.nnicrosoft.com/en-us/library/ms172417(SQL.110).aspx>>,Retrieved Date: Jul. 7, 2011, Pages 7.
"How to: Use SQL Server Change Tracking", Retrieved at <<http://technet.nnicrosoft.com/en-us/library/cc761496(SQL.90).aspx>>, Retrieved Date: Jul. 8, 2011, Pages 19.
Sturms, James, "Creating Large-Scale Applications with MS Access 97", Retrieved at <<http://technet.microsoft.com/en-us/library/cc767938.aspx>>, Retrieved Date: Jul. 8, 2011, Pages 26.
"How the Active Directory Replication Model Works", Retrieved at <<http://technet.microsoft.com/en-us/library/cc772726(WS.10).aspx>>, Mar. 2, 2011, Pages 47.
Vega, Diego,B., "Choosing an Entity Framework API", Retrieved at <<http://blogs.nrisdn.com/b/diego/archive/2007/11/11/choosing-an-entity-framework-api.aspx>>, Nov. 11, 2007, Pages 3.

* cited by examiner

*Primary Examiner* — Usmaan Saeed
*Assistant Examiner* — MD. I Uddin
(74) *Attorney, Agent, or Firm* — Turk IP Law, LLC (57) ABSTRACT

A system is provided for tracking changes from two or more tables stored in a database management system. The system may enable two or more applications to track changes from two or more tables in the database management system, and may enable one or more tables to be tracked for changes concurrently. The system may be configured to automatically build a change tracking query in order to retrieve tracked changes from a collection of related tables, or an entity, in the database management system. The entity based tracking system may determine the relationships between the tables in the entity, and may generate a relational query based on the determined relationships. The system may automatically construct a union query from the relational query to activate tracking changes across the collection of tables in the database management system.

12 Claims, 6 Drawing Sheets

TRACKING CHANGES ACROSS COLLECTION OF DATA TABLES

BACKGROUND

Many database management systems enable data and the relationships among the data to be stored in tables. An important requirement for some applications is the ability to query for data that has changed in a database and to generate a record of how the data has changed since a given date and time. Tracking changes enables applications to query for the data that has changed in a table, and to obtain the changes and information about those changes. Some change tracking techniques are available for enabling an application to track data changes from a single table in a database, and may enable applications to query for the data that has changed in a single table in a database management application. One change tracking technique may capture insert, update, modification, and delete activity applied to a database management system that implements structured query language (SQL) and can provide information about the details of the changes. Another change tracking technique may be a more limited technique for capturing data changes and may capture the fact that rows and/or columns in a table were changed, however this technique may not capture the specific information as to how the data was changed and when.

Some applications may need to track the changes across a collection of related tables, or an entity document. Typically, in order to track changes to data in multiple tables stored in a database management system and access information about the changes, a more complex, specific and exact query must be generated. If the exact query language is not generated, then the tracked changes desired may not be able to be retrieved by the query from the collection of related tables in the database management system. Generating the query for tracking changes across multiple tables in the database management system may require application developers to implement a custom change tracking mechanism themselves, which may requiring extensive programming knowledge and skill and complex coding schemes. For example, creating a change tracking query may require using programming techniques including a creating a combination of triggers, timestamp columns, new tables to stores the tracking information and creating a custom cleanup process.

Many applications work at a higher level of abstraction than tables commonly referred to as the domain representation or logical representation of a schema. This higher level of abstraction is mapped to the physical database schema. Typically the mapping is outside the scope of the database management system.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to automatically generating a change tracking query for tracking changes from two or more tables stored in a database management system. A system according to embodiments may enable one or more applications to request to track changes from two or more tables in the database management system. Additionally, the system may enable one or more of the tables in the database management system to be tracked for changes by two or more applications concurrently. The system may be configured to automatically build a change tracking query in order to retrieve tracked changes from a collection of related tables in the database management system. The system may identify the collection of related tables in the database management system as an entity, or a business document, and the system may use the entity to automatically generate the change tracking query. The entity based tracking system may determine the relationships between the tables in the entity and may generate a relational query based on the determined relationships. The system may automatically construct a union query from the relational query to activate tracking changes across the collection of tables in the database management system.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, a system is provided for tracking changes from two or more tables stored in a database management system. The system may enable one or more applications to track changes from two or more tables in the database management system. Additionally, the system may enable one or more of the tables in the database management system to be tracked for changes concurrently by two or more applications. The system may be configured to automatically build a change tracking query in order to retrieve tracked changes from a collection of related tables in the database management system. The system may identify the collection of related tables in the database management system as an entity, or a business document, and the system may use the entity to automatically generate the change tracking query. The entity based tracking system may determine the relationships between the tables in the entity, and may generate a relational query based on the determined relationships. The system may automatically construct a union query from the relational query to activate tracking changes across the collection of tables in the database management system.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for building and modifying (as well as executing) database applications. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Figure 1:
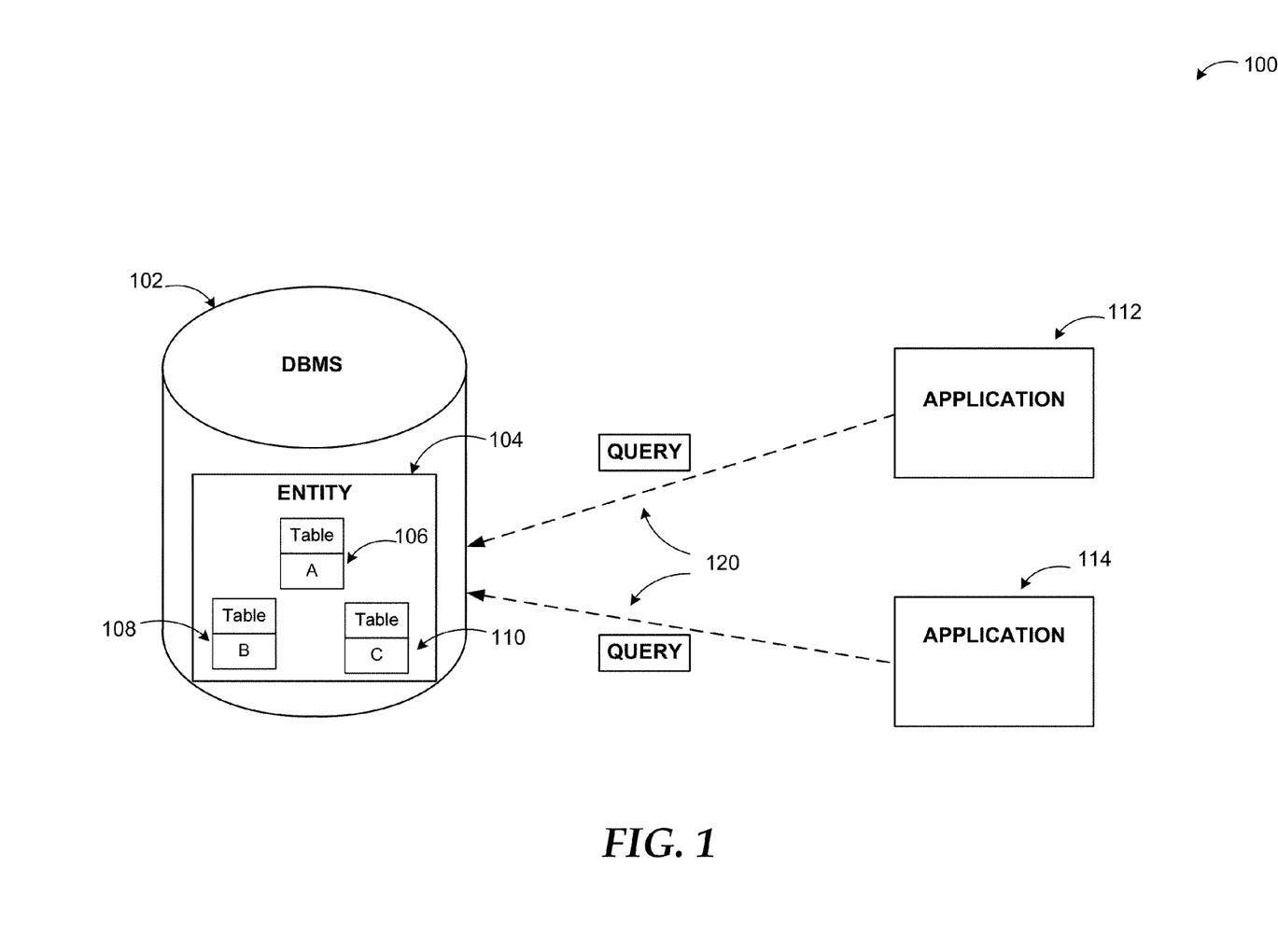
FIG. 1 illustrates a system for tracking changes across a collection of tables in a database management system according to embodiments.

FIG. 1 illustrates a system for tracking changes across a collection of tables in a database management system according to embodiments. In a system according to embodiments, an application 112, 114 may request to track the changes that occur in two or more tables 106, 108, 110 contained in a database management system (DBMS) 102. The database management system (DBMS) 102 may store data in tables, and a collection of two or more tables may be organized as an entity 104 within the database management system 102. The database management system 102 may store the collection of tables 106, 108, 110 as well as the relationships in the collection of tables 106, 108, 110 within the entity 104.

A system according to embodiments may enable tracking changes across the two or more tables in the entity, such that if any portion of the entity changes, the changes may be documented and reported. An entity based change tracking system (EBCT system) may enable one or more applications to track changes occurring in two or more tables of the entity 104 in the DBMS 102. Typically, an application may generate a query to track changes in a selected table stored within a database. In order to track changes in two or more selected tables, the application may need to generate a more complex query, which may require application developers to custom build the change tracking query using extensive programming and coding schemes. The EBCT system may be configured to automatically generate a change tracking query 120 for tracking changes in two or more tables 106, 108, 110 within the entity 104 in the DBMS 102. The EBCT system may generate the change tracking query 120 to track changes across the collection of tables 106, 108, 110 in the entity 104 based upon a determined relationship between the collection of tables in the entity, such that the executed change tracking query 120 may return the changes across the collection of tables in the entity.

In an example embodiment, an application 112 may request the EBCT system to track the changes on Table A 106, Table B 108 and Table C 110 in the database management system 102. The EBCT system may identify Table A 106, Table B 108 and Table C 110 as the entity 104 and may determine the relationships between Table A 106, Table B 108 and Table C 110. Based on the determined relationships between the tables, the EBCT system may build the change tracking query 120 automatically, and may not require the application 112 to generate the complex change tracking query 120. The change tracking query 120 may be generated based on the determined relationships between the tables in the entity 104 of the DBMS 102. In some cases, the entity 104 may consist of object oriented definitions and concepts, and in other cases the entity 104 may consist of relational definitions and concepts. The EBCT system may transform an object oriented definition to a relational query, and may further construct a union query which may perform the change tracking across the collection of tables in the DBMS.

Figure 2:
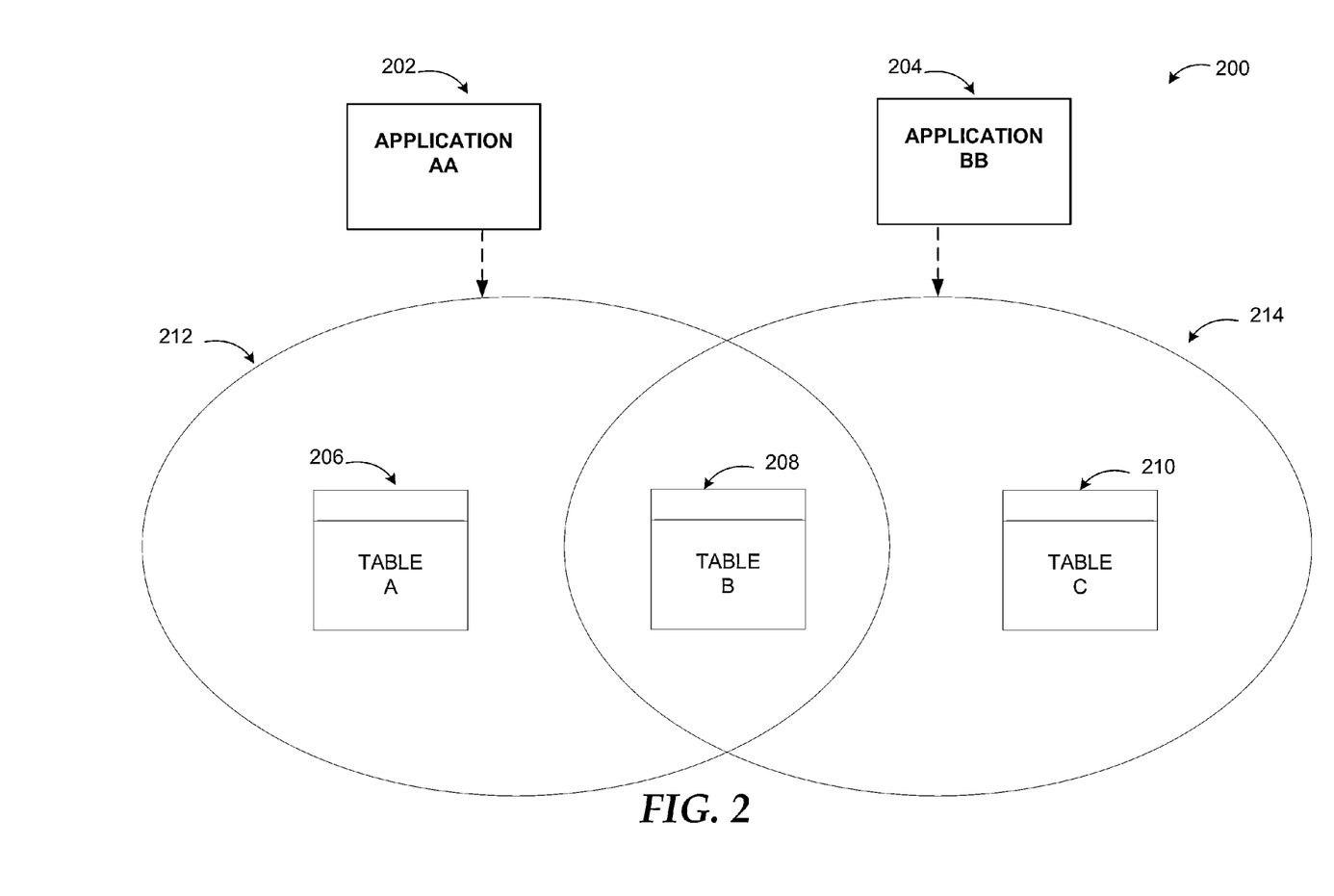
FIG. 2 illustrates an example entity based system for managing change tracking of overlapping tables by multiple applications, according to embodiments.

FIG. 2 illustrates an example entity based system for managing change tracking of overlapping tables by multiple applications, according to embodiments. In a system according to embodiments, the EBCT system may be configured to manage change tracking of one or more overlapping tables by two or more applications. At a given time, two or more applications may request to track changes on tables in the DBMS, such that one or more tables of an entity in the DBMS may be tracked for changes by multiple applications concurrently.

In an example embodiment, a first application 202 may request to track changes on two or more tables in the entity of the database management system. The EBCT system may automatically decompose the entity into a relational query in order to track changes on each of the requested tables and may activate the change tracking mechanism on each of the requested tables in the entity. A second application 204 may also request to track changes on two or more tables in the entity in the database management system, and the EBCT system may activate change tracking on each of the tables in the entity requested by the second application 204. In a situation where the first application 202 and the second application 204 have both requested to activate change tracking by the EBCT system on the same table, the EBCT system may recognize that the changes tracked on the overlapping table, Table B 208, should be reported to both the first application 202 and the second application 204.

In a system according to embodiments, the EBCT system may enable a scope mechanism in order to manage tracking changes on a table by two or more applications, such that the same table may be activated for change tracking in multiple scopes. When an application requests to track changes on two or more tables in the entity, the EBCT system may organize the tables which have been activated for change tracking into a "scope," which may be associated with the application which made the request. For example, when the first application 202 requests to track changes on two tables, Table A 206 and Table B 208, the EBCT system may organize Table A 206 and Table B 208 into a scope 212, which may be associated with the first application 202 that made the change tracking request. Additionally, when the second application 204 requests to track changes on two or more tables, such as Table B 208 and Table C 210, the EBCT system may organize Table B 208 and Table C 210 into a second scope 214, which may be associated with the second application 204 that made the change tracking request. The overlapping table, Table B 208, may be activated for change tracking in both the first scope 212 and the second scope 214.

The EBCT system may utilize the scopes in order to manage change tracking requests by the applications, such that if a table is activated for change tracking in one or more scopes, then the EBCT system may not disable the change tracking on the table while it is activated by an application for change tracking. For example, if the first application 202 discontinues the change tracking request on tables in the entity, the EBCT system may disable the change tracking on Table A 206. However, Table B 208 may still be activated for change tracking in the second scope 214 by the second application 204, so the EBCT system may not disable change tracking on Table B 208 while Table B 208 is activated for change tracking in the second scope 214. The EBCT system may consider the scopes when inactivating change tracking, and a table may only be disabled for change tracking when there is no scope referencing it.

Figure 3:
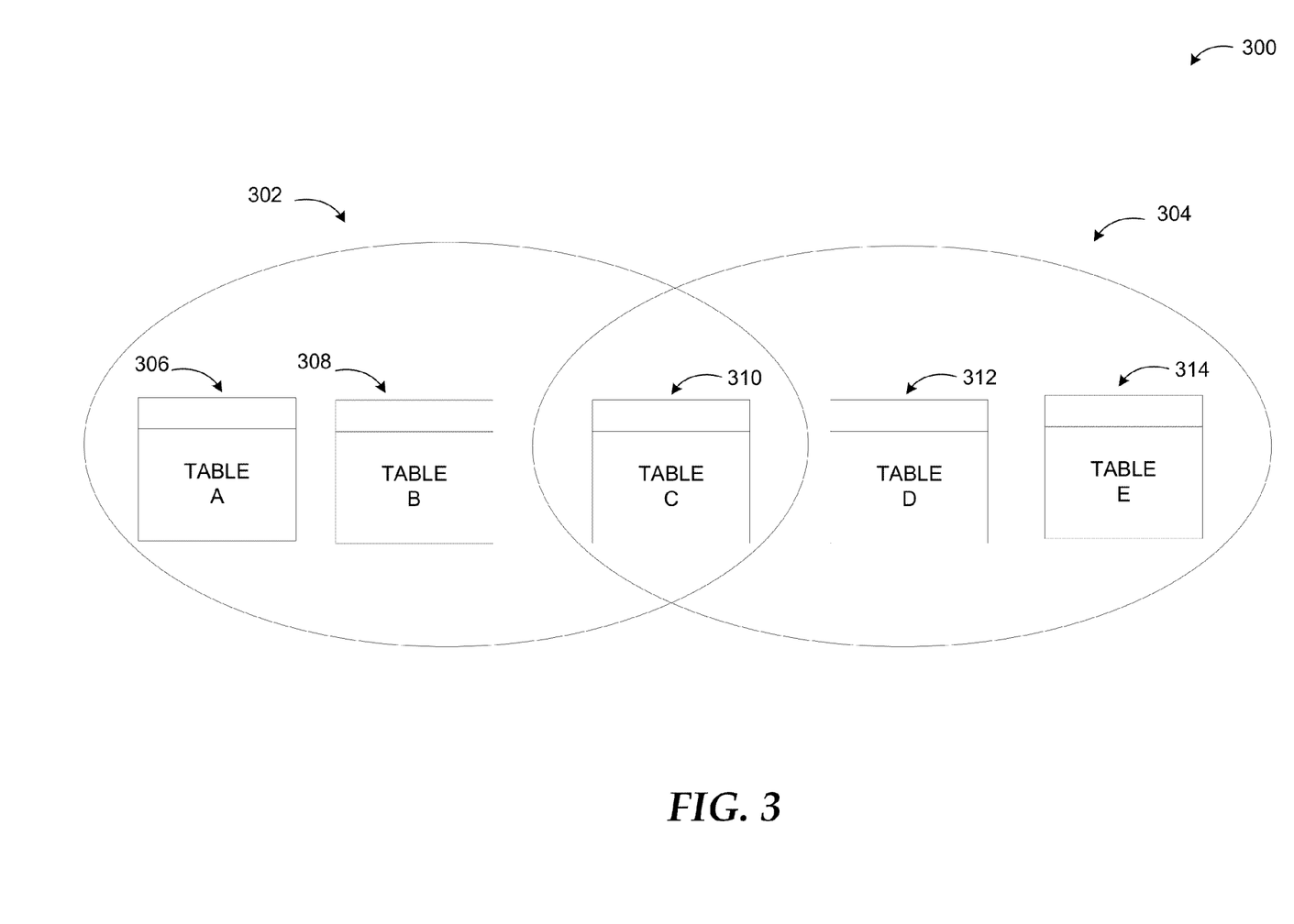
FIG. 3 illustrates an entity based system for generating a change tracking query across a collection of tables in a database management system according to embodiments.

FIG. 3 illustrates an entity based system for generating a change tracking query across a collection of tables in a database management system according to embodiments. As described above in conjunction with FIG. 1, the database management system (DBMS) may store data in tables, and the relationships between the tables may also be stored in the DBMS. The related tables may be organized together in the DBMS as a collection of tables, or an entity 302. A system according to embodiments may be configured to automatically generate a change tracking query in order to track changes across the collection of tables in the entity 302 in the DBMS.

In an example embodiment, an application may select a collection of tables in the DBMS on which it would like to track changes. For example, the application may request to activate change tracking by the EBCT system of Table A 306, Table B 308 and Table C 310, which may be an entity in the DBMS. The tables in the entity in the DBMS may be stored using object oriented concepts. The EBCT system may be configured to determine the relationships between Table A 306, Table B 308 and Table C 310, and may decompose the object oriented concepts of the entity to generate a relational query for the tables in the entity. The EBCT system may subsequently transform the relational query into a union query to retrieve the changes across all of the selected tables in the entity 302. The union query may allow for combining two or more relational queries in order to retrieve changes across two or more tables in the entity 302. The changes in each table in the entity 302 may be returned as changes in a root table that represents the entity 302.

In an example embodiment, Table A 306 may be considered as the root table for the entity, which may also include Table B 308 and Table C 310. An application may request to track changes on the entity including Table A 306, Table B 308, and Table C 310. The EBCT system may be configured to activate change tracking on Table A, 306, Table B 308, and Table C 310 and may report tracked changes through the root table, Table A 306. A change may be reported if an insert, update, modification, or delete occurs on any of the tables included in the entity.

In an example scenario, the EBCT system may be programmed to report the changes to any table in the entity as a change to the root table, Table A. The EBCT system may be programmed as follows: "Signal that Table A has changed if an insert occurs on Table A, an update occurs on Table A, or Table A is deleted. Additionally, Signal that Table A has changed if an insert occurs on Table B and/or Table C, an update occurs on Table B and/or Table C, or Table B and/or Table C is deleted."

In order to report the changes to tables in the entity through the root table, the EBCT system may generate the following queries:

Select changes from Table A.
Select changes from Table A
Union
Select changes from Table B join Table A on relation between Table B, Table A
Union
Select changes from Table C join Table B on relation between Table C, Table B join Table A on relation between Table A, Table B As described above, the EBCT system may transform the object oriented concepts of the entity to a relational query for the tables in the entity 302, and may build the above example union queries to retrieve the changes across all of the tables in the entity. The above example union queries may return the changes across all the tables (Table A, Table B, Table C) by reporting the changes through the root table, Table A 306.

In another example scenario, the entity may be defined as follows:

Cat→Owner

In this example, an entity query may return all cats and their owners. The entity may use object oriented concepts, which may be stored in tables in the entity, such as the following:

Cat is related to mammal.
Mammal is related to animal.
Animal has an owner property pointing to a person.

If an application desires to track changes on the entity to return only changed cats, the EBCT system may transform the object oriented concepts into a relational query based on the determined relationships between the objects in the entity, and may then construct a union query to return the changes across the collection of tables in the entity. The EBCT may expand the entity definition (Cat Owner) into a relational query, based on the determined relationships between the tables in the entity and may generate the following relational query:

Select cat.*, mammal *, animal.*from Cat join mammal on cat.key=mammal key join animal on cat.key=animal.key join Person on cat.owner=person.key From the relational query, the EBCT system may construct the union query for returning only changed cats in the entity as follows:

Select A.key from DB_ENGINE_CHANGES(Animal) A
Union
Select A.key from DB_ENGINE_CHANGES(Mammal) M join Animal A on M.Key=A.Key
Union
Select A.key from DB_ENGINE_CHANGES(Cat) C join Mammal M on C.key=M.key join Animal A on M.Key=A.Key Union
   Select A.key from DB_ENGINE_CHANGES(Cat) C join
      Mammal M on C.key=M.key join Animal A on
      M.Key=A.Key
Union
   Select A.key from DB_ENGINE_CHANGES(Person) P
      join Mammal M on P.key=M.Owner join Animal A on
      M.Key=A.Key Thus, the transformation from object oriented concepts in the entity to the relational query based on the relationships between the tables in the entity, and the automatic generation of the union query may enable the EBCT system to return tracked changes across the collection of tables in the entity.

In another example embodiment, the EBCT system may be configured to generate triggers that indicate changes in the root table when a delete action occurs in a related sub-table or child table. The EBCT system may detect deletes in the child tables, and may generate a trigger to indicate the deletes in the root table, for avoiding a situation where deleted data is eliminated from the DBMS with no record that something was deleted or what the information was that was deleted In an example scenario an application may select to track changes on an entity consisting of the collection of Table C 310, Table D 312 and Table E 314. As discussed above in conjunction with FIG. 2, the tracked tables may be organized into a scope 304 by the EBCT system for managing the change tracking on the requested tables. When the application selects the entity or collection of tables for tracking changes, the EBCT system may determine the relationships between the tables in the entity and determine which root table the child tables are related to in order to generate a trigger in the root table.

The triggers may be generated per scope such that the root table and relationship to the child tables may be identified according to the associated scope. Table C 310 may be considered as the root table for the scope 304, such that changes in Table D 312 and Table E 314 may be reported in the root table, Table C 310. When there is a delete on one or more of the child tables, Table D 312 and Table E 314, the EBCT system may be configured to generate a trigger that may signal on the root table, Table C 310, that a delete occurred in a child table. This way the data does not disappear without any record, but the EBCT system may provide the application with information as to the fact that something was deleted and specific information as to what was deleted.

The example systems in FIG. 1 through 3 have been described with specific configurations, applications, and interactions. Embodiments are not limited to systems according to these examples. A system for tracking changes across a collection of tables in a database management system may be implemented in configurations employing fewer or additional components and performing other tasks. Furthermore, specific protocols and/or interfaces may be implemented in a similar manner using the principles described herein.

Figure 4:
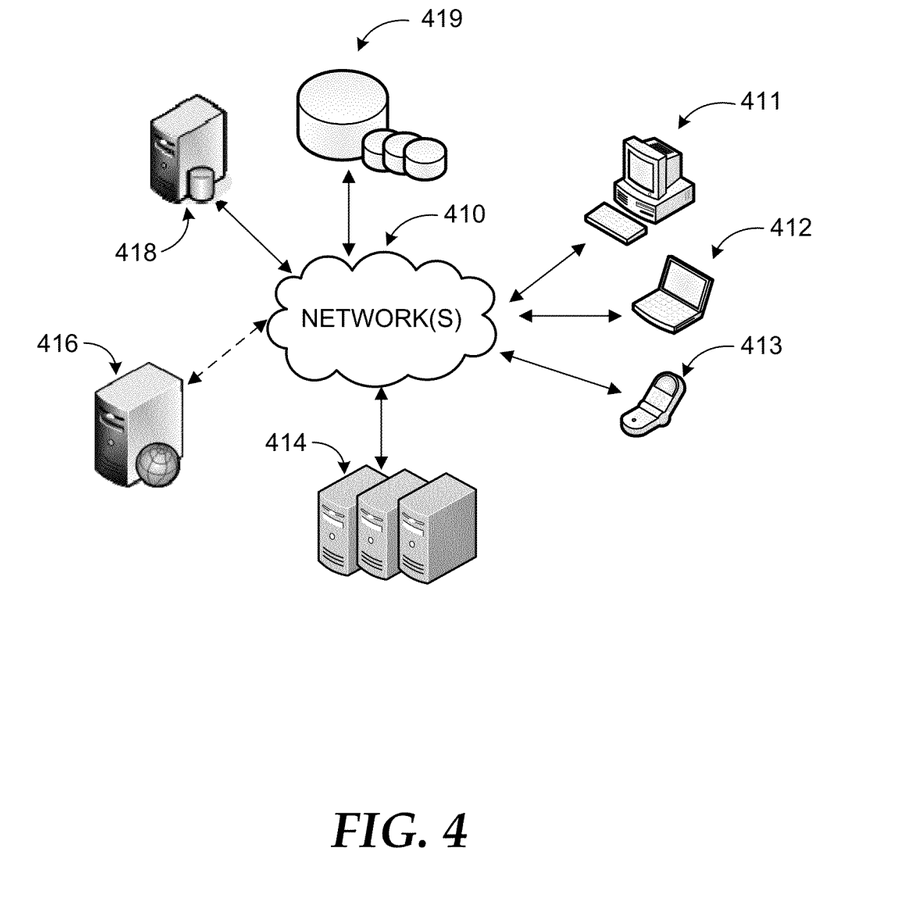
FIG. 4 is a networked environment, where a system according to embodiments may be implemented.

FIG. 4 is an example networked environment, where embodiments may be implemented. A system for tracking changes across a collection of tables in a database management system may be implemented via software executed over one or more servers 414 such as a hosted service. The platform may communicate with client applications on individual computing devices such as a smart phone 413, a laptop computer 412, or desktop computer 411 ('client devices') through network(s) 410.

Client applications executed on any of the client devices 411-413 may facilitate communications via application(s) executed by servers 414, or on individual server 416. An application executed on one of the servers may facilitate automatically generating a change tracking query in order to track changes across a collection of tables stored in a database management system. The application may enable one or more applications to select two or more tables in a database management system on which the one or more applications may desire to track changes. The application may enable a change tracking mechanism which may identify the selected tables as a collection of tables or an entity and may determine a relationship between the selected tables in the entity. The application may further enable the change tracking mechanism to automatically generate a relational query for tracking the changes in each of the tables in the collection of tables, and from the relational query, the change tracking mechanism may construct a union query which may enable the system to track changes across the collection of tables in the database management system. The application may retrieve relevant data from data store(s) 419 directly or through database server 418, and provide requested services (e.g. document editing) to the user(s) through client devices 411-413.

Network(s) 410 may comprise any topology of servers, clients, Internet service providers, and communication media. A system according to embodiments may have a static or dynamic topology. Network(s) 410 may include secure networks such as an enterprise network, an unsecure network such as a wireless open network, or the Internet. Network(s) 410 may also coordinate communication over other networks such as Public Switched Telephone Network (PSTN) or cellular networks. Furthermore, network(s) 410 may include short range wireless networks such as Bluetooth or similar ones. Network(s) 410 provide communication between the nodes described herein. By way of example, and not limitation, network(s) 410 may include wireless media such as acoustic, RF, infrared and other wireless media.

Many other configurations of computing devices, applications, data sources, and data distribution systems may be employed to implement a platform for tracking changes across a collection of tables in a database management system. Furthermore, the networked environments discussed in FIG. 4 are for illustration purposes only. Embodiments are not limited to the example applications, modules, or processes.

Figure 5:
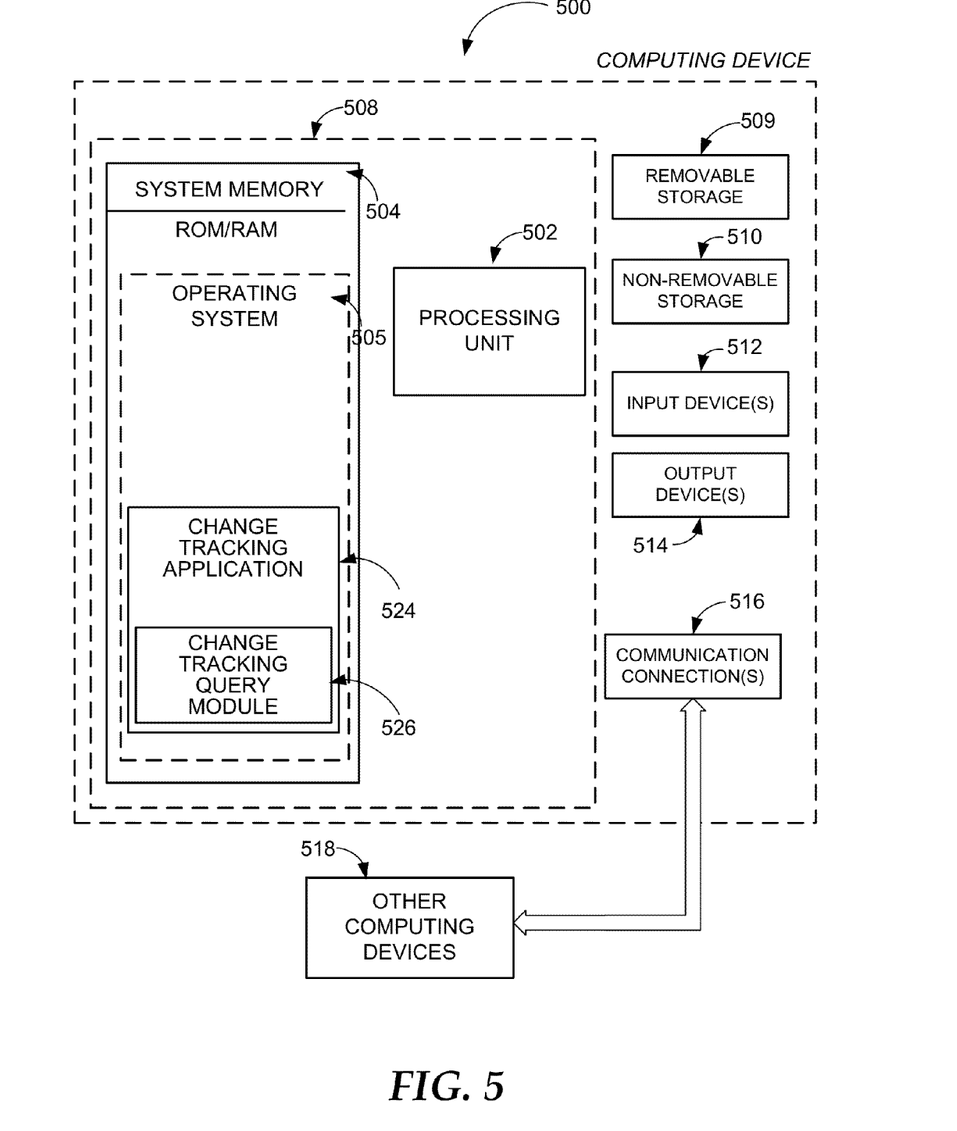
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computing device 500. In a basic configuration, computing device 500 may be any computing device executing an application for tracking changes across a collection of tables in a database management system according to embodiments and include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS ® operating systems from MICROSOFT CORPORATION of Redmond, Washington. The system memory 504 may also include one or more software applications such as a change tracking application 524 and a change tracking query module 526.

The change tracking application 524 may facilitate enabling an entity based change tracking system (EBCT system) to automatically generate a change tracking query in order to track changes across a collection of tables stored in a database management system. The application may enable the EBCT system to detect when one or more applications select two or more tables in a database management system on which the one or more applications may desire to track changes. The application may enable a change tracking mechanism which may identify the selected tables as a collection of tables or an entity and may determine a relationship between the selected tables in the entity. The collection of tables, or the entity, may be organized together as a scope which may be associated with the application that selected the collection of tables for activating tracking changes. The change tracking query module 526, which may be a distinct application or an integrated module of change tracking application 524, may automatically generate a relational query for tracking the changes in each of the tables in the collection of tables based on the determined relationship between the selected tables. From the relational query, the change tracking mechanism may automatically construct a union query which may enable the system to track changes across the collection of tables in the database management system. The tracked changes may be reported through a root table representing the collection of tables in the entity. This basic configuration is illustrated in FIG. 5 by those components within dashed line 508.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch input device, and comparable input devices. Output device(s) 514 such as a display, speakers, printer, and other types of output devices may also be included. These devices are well known in the art and need not be discussed at length here.

Computing device 500 may also contain communication connections 516 that allow the device to communicate with other devices 518, such as over a wired or wireless network in a distributed computing environment, a satellite link, a cellular link, a short range network, and comparable mechanisms. Other devices 518 may include computer device(s) that execute communication applications, web servers, and comparable devices. Communication connection(s) 516 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
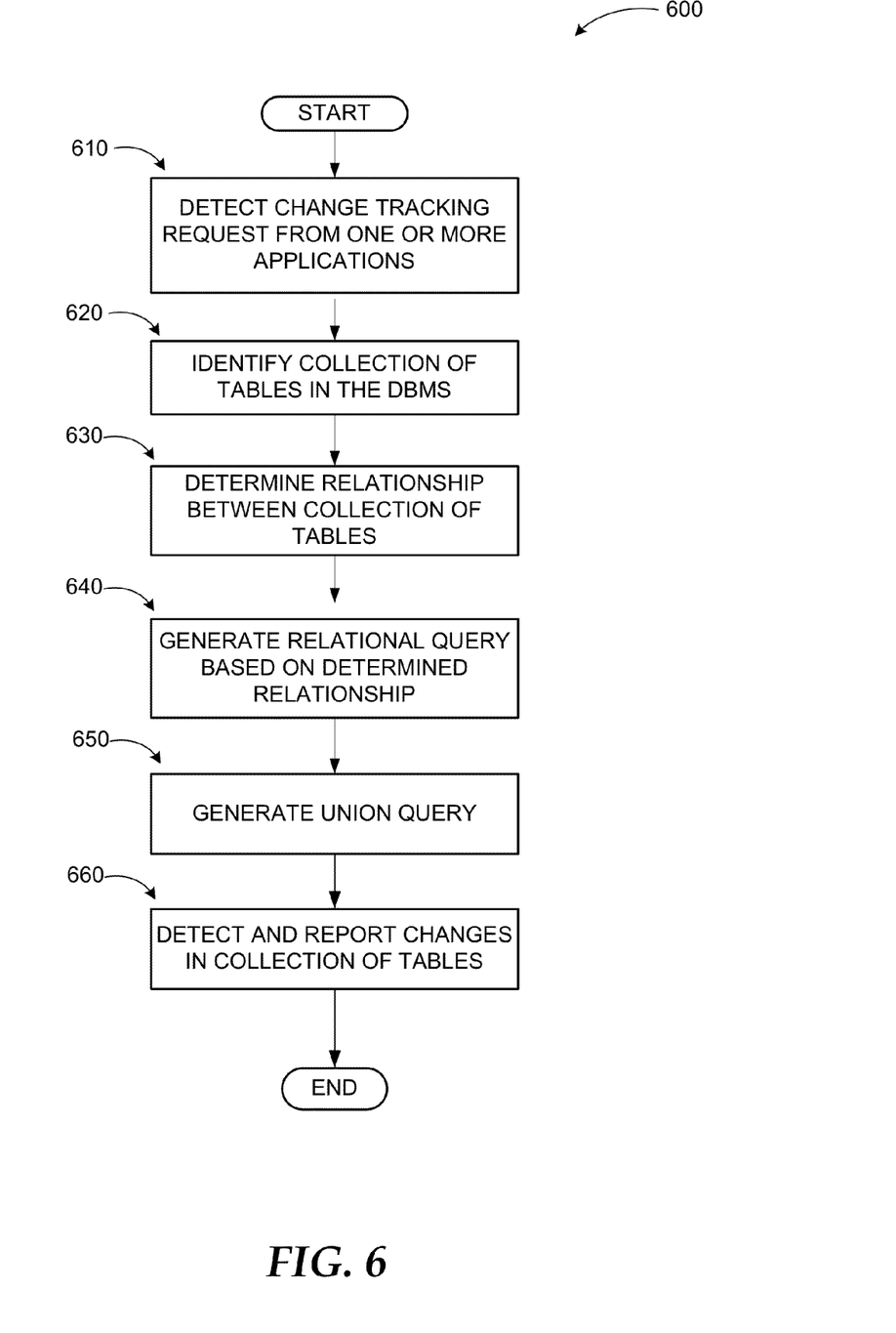
FIG. 6 illustrates a logic flow diagram for a process of tracking changes across a collection of tables in a database management system according to embodiments.

FIG. 6 illustrates a logic flow diagram for process 600 of tracking changes across a collection of tables in a database management system according to embodiments. Process 600 may be implemented on a computing device or similar electronic device capable of executing instructions through a processor.

Process 600 begins with operation 610, where the entity based change tracking system may detect a change tracking request from one or more applications. An application may select two or more tables in a database management system (DBMS) on which it would like to track changes. At operation 620, the two or more tables selected for change tracking may be identified as a collection of tables in the DBMS. The collection of two or more tables may be organized as an entity 104 within the database management system 102. The database management system may store the collection of tables as well as the relationships between the collection of tables within the entity. The entity, or the collection of tables which have been activated for change tracking, may be organized into a "scope," for managing the change tracking, and the scope may be associated with the application which made the request.

At operation 630, the system may determine the relationships between each of the tables in the collection of tables in the entity. The system may also determine a root table for the collection of tables such that the system may report tracked changes through the root table. The tables in the entity in the DBMS may be stored using object oriented concepts and/or relational concepts. Upon determining the relationships between the collection of tables in the entity, at operation 640, the system may generate a relational query based on the determined relationship. If the entity data is stored in the DBMS using object oriented concepts, the system may decompose the object oriented concepts to generate a relational query for the tables in the entity.

At operation 650, the system may transform the relational query into a union query to retrieve the changes across all of the selected tables in the entity. The union query may allow for combining two or more relational queries in order to retrieve changes across the collection of tables. At operation 660, the system may track the changes in the selected tables and may return the tracked changes to the applications. The changes in each table in the entity may be returned as changes in the root table that represents the entity.

The operations included in process 600 are for illustration purposes. Tracking changes across a collection of tables in a database management system may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed at least in part in a computing device for tracking changes in two or more tables stored in a database management system, the method comprising:
   detecting a change tracking request on two or more tables stored in the database management system from one or more applications;
   identifying the two or more tables as a collection of related tables in the database management system;
   determining relationships between the two or more tables in the collection of related tables;
   organizing the collection of related tables and the relationships between the tables together in the database management system as an entity, wherein the entity utilizes one or more of: object oriented concepts and relational concepts;
   identifying a root table from the collection of related tables representing the entity in the database management system;
   generating a relational query based on the determined relationships between the two or more tables in the collection of related tables;
   transforming the relational query into a union query to track the changes across the collection of related tables in the database management system;
   generating a change tracking query to track the changes across the collection of related tables in the database management system;
   reporting tracked changes on any table in the entity through the root table, wherein a tracked change is reported if an insert, update, modification, or delete occurs on any of the two or more tables in the entity;
   enabling two or more applications to track changes on the one or more tables in the database management system concurrently;
   enabling a scope mechanism for managing tracking changes on the one or more tables in the database management system by the two or more applications, wherein the collection of related tables in the database management system is organized into a plurality of scopes;
   associating a first collection of related tables activated for change tracking by a first application into a first scope;
   associating a second collection of related tables activated for change tracking by a second application into a second scope; and
   identifying one or more tables from the first collection of related tables and the second collection of related tables that have been associated with both the first scope and the second scope.

2. The method of claim 1, wherein generating the relational query further comprises:
   if the entity utilizes object oriented concepts, decomposing the entity to generate one or more relational queries.

3. The method of claim 1, further comprising:
   generating a trigger on the root table when a delete action occurs on a child table related to the root table.

4. The method of claim 1, further comprising:
   reporting the tracked changes on a table in the entity through the root table.

5. The method of claim 1, further comprising:
   combining two or more relational queries in order to retrieve the tracked changes across the collection of related tables.

6. A server for tracking changes in two or more tables stored in a database management system, comprising:
   a memory storing instructions;
   a processor coupled to the memory, the processor executing a change tracking application, wherein the change tracking application is configured to:
      detect a change tracking request on two or more tables stored in the database management system from one or more applications;
      identify the two or more tables as a collection of related tables in the database management system;
      determine relationships between the two or more tables in the collection of related tables;
      organize the collection of related tables and the relationships between the tables together in the database management system as an entity, wherein the entity utilizes one or more of: object oriented concepts and relational concepts;
      identify a root table from the collection of related tables representing the entity in the database management system;
      generate a relational query based on the determined relationships between the two or more tables in the collection of related tables;
      transform the relational query into a union query to track the changes across the collection of related tables in the database management system;
      generate a change tracking query to track the changes across the collection of related tables in the database management system;
      reporting tracked changes on any table in the entity through the root table, wherein a tracked change is reported if an insert, update, modification, or delete occurs on any of the two or more tables in the entity;
      enable two or more applications to track changes on the one or more tables in the database management system concurrently;
      enabling a scope mechanism for managing tracking changes on the one or more tables in the database management system by the two or more applications, wherein the collection of related tables in the database management system is organized into a plurality of scopes;
      associate a first collection of related tables activated for change tracking by a first application into a first scope;
      associate a second collection of related tables activated for change tracking by a second application into a second scope; and
      identify one or more tables from the first collection of related tables and the second collection of related tables that have been associated with both the first scope and the second scope.

7. The server of claim 6, wherein the change tracking application is further configured to:
   report tracked changes on at least one of the two or more tables in the entity through the root table, wherein a tracked change is reported if one of an insert, an update, a modification, and a delete occurs on the at least one of the two or more tables in the entity.

8. The server of claim 6, wherein the entity utilizes one or more of: object oriented concepts and relational concepts, and the change tracking application is further configured to:
- if the entity utilizes object oriented concepts, decompose the entity to generate one or more relational queries;
- combine two or more relational queries in order to retrieve tracked changes across the collection of related tables; and
- transform the two or more relational queries into a union query to track the changes across the collection of related tables.

9. The server of claim 6, wherein the scope mechanism for managing tracking changes is further configured to:
- prevent the one or more tables that have been associated with both the first scope and the second scope from being inactivated for change tracking in the first scope by the first application while the tables are activated for change tracking in the second scope by the second application.

10. The server of claim 6, wherein the change tracking application is further configured to:
- identify when a delete action occurs on a child table related to the root table, wherein a delete action occurs when one or more of: a line within the child table is deleted and when an entire child table is deleted from the entity; and
- generate a trigger on the root table when the delete action occurs on the child table.

11. A computer-readable memory with instructions stored thereon for tracking changes in two or more tables stored in a database management system, the instructions comprising:
- detecting a change tracking request on two or more tables stored in the database management system from one or more applications;
- identifying the two or more tables as a collection of related tables in the database management system;
- determining relationships between the two or more tables in the collection of related tables;
- organizing the collection of related tables and the relationships between the tables together in the database management system as an entity, wherein the entity utilizes one or more of: object oriented concepts and relational concepts;
- identifying a root table from the collection of related tables representing the entity in the database management system;
- generating a relational query based on the determined relationships between the two or more tables in the collection of related tables;
- transforming the relational query into a union query to track the changes across the collection of related tables in the database management system;
- generating a change tracking query to track the changes across the collection of related tables in the database management system;
- reporting tracked changes on any table in the entity through the root table, wherein a tracked change is reported if an insert, update, modification, or delete occurs on any of the two or more tables in the entity;
- enabling two or more applications to track changes on the one or more tables in the database management system concurrently;
- enabling a scope mechanism for managing tracking changes on the one or more tables in the database management system by the two or more applications, wherein the collection of related tables in the database management system is organized into a plurality of scopes;
- associating a first collection of related tables activated for change tracking by a first application into a first scope;
- associating a second collection of related tables activated for change tracking by a second application into a second scope; and
- identifying one or more tables from the first collection of related tables and the second collection of related tables that have been associated with both the first scope and the second scope.

12. The computer-readable memory of claim 11, wherein the instructions further comprise one of:
- associating the root table with a scope;
- identifying when a delete action occurs on a child table related to the root table of the scope, wherein a delete action occurs when one or more of: a line within the child table is deleted and when an entire child table is deleted from the entity; and
- generating a trigger on the root table for the scope when the delete action occurs on one or more child tables within the scope.

* * * * *